United States Patent

Pias et al.

[11] Patent Number: 5,974,911
[45] Date of Patent: Nov. 2, 1999

[54] FACE-GEAR TRANSMISSION ASSEMBLY WITH FLOATING BALANCE PINIONS

[75] Inventors: Roberto Pias, Cagliari; Sergio Turro, Turin, both of Italy

[73] Assignee: Fiatavio S.p.A., Turin, Italy

[21] Appl. No.: 09/098,070

[22] Filed: Jun. 16, 1998

[51] Int. Cl.$^6$ ............................................... F16H 1/22
[52] U.S. Cl. ..................... 74/665 C; 74/665 A; 74/411; 74/416
[58] Field of Search ................... 74/661, 665 R, 74/665 A, 665 C, 406, 410, 411, 417, 423; 416/170 R

[56] References Cited

U.S. PATENT DOCUMENTS

| | | | |
|---|---|---|---|
| 2,865,219 | 12/1958 | Allen | 74/410 |
| 3,602,068 | 8/1971 | White | 74/661 |
| 4,437,355 | 3/1984 | Bordat | 74/417 X |
| 4,983,153 | 1/1991 | Luijten | 74/416 X |
| 5,178,028 | 1/1993 | Bossler, Jr. | 74/661 |
| 5,233,886 | 8/1993 | Bossler, Jr. | 74/665 F |
| 5,239,880 | 8/1993 | Hawkins et al. | 74/406 |
| 5,572,910 | 11/1996 | Tomaselli et al. | 74/661 X |
| 5,802,918 | 9/1996 | Chen et al. | 74/665 A X |
| 5,807,202 | 9/1998 | Sammataro | 74/665 C X |

FOREIGN PATENT DOCUMENTS

WO 98/16762  4/1998  WIPO.

*Primary Examiner*—Charles A Marmor
*Assistant Examiner*—Ankur Parekh
*Attorney, Agent, or Firm*—Kinney & Lange, P.A.

[57] ABSTRACT

A gear transmission assembly for transferring a drive torque from at least one power input to a primary user has at least one drive pinion carried by a respective power input shaft and meshing with a pair of facing coaxial counter-rotating ring gears having an axis perpendicular to the axis of the drive pinion and engaging between facing face teeth at least one transmission pinion having an axis perpendicular to the axis of the ring gears. The at least one drive pinion floats in the direction of the axis of the ring gears, while the at least one transmission pinion is supported by elements flexible in a circumferential direction with respect to the ring gears.

8 Claims, 2 Drawing Sheets

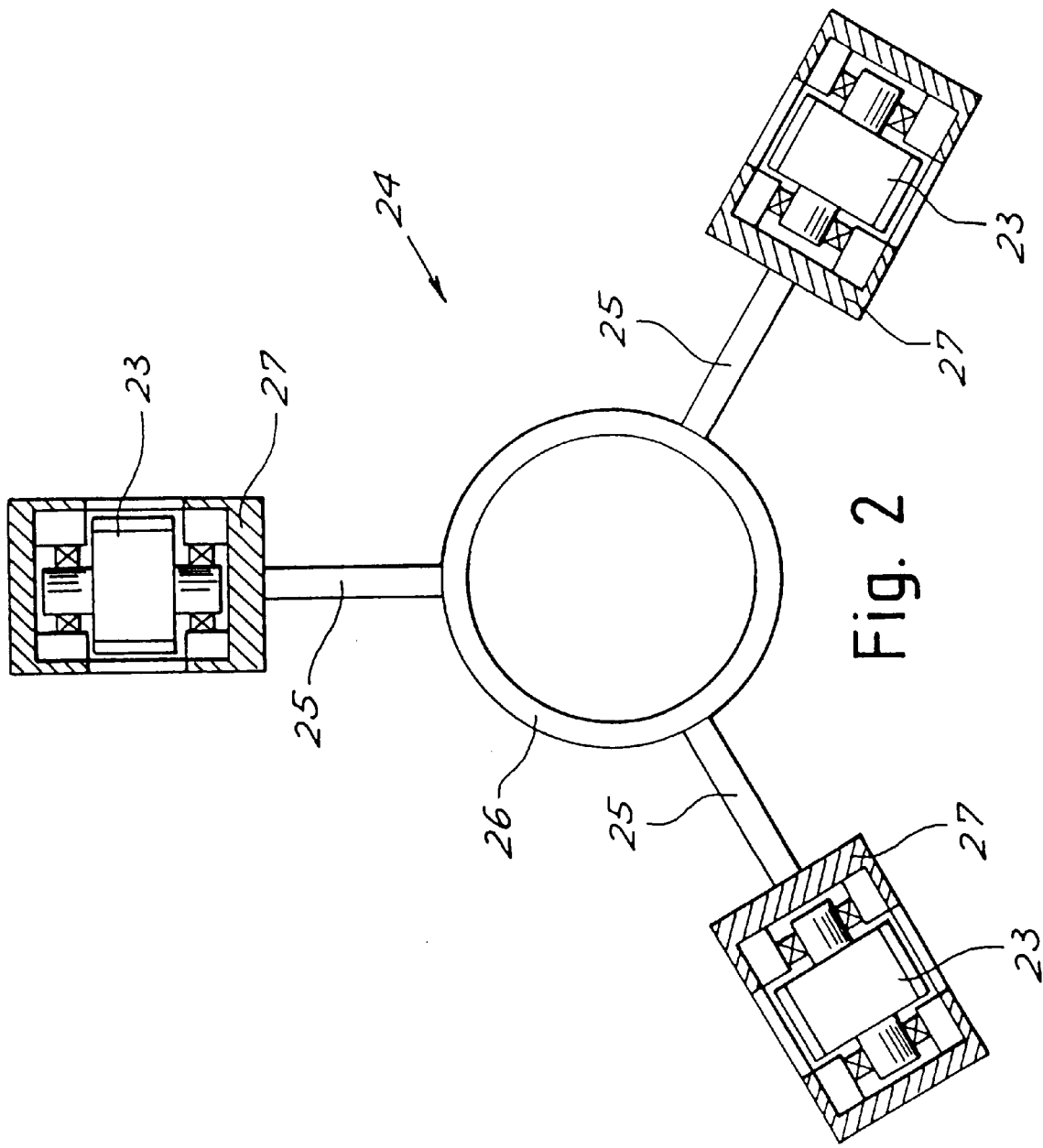

FACE-GEAR TRANSMISSION ASSEMBLY WITH FLOATING BALANCE PINIONS

BACKGROUND OF THE INVENTION

The present invention relates to a gear transmission, in particular for aircraft, featuring face gears, i.e. ring gears with face teeth, meshing with cylindrical pinions with axes perpendicular to the axes of the ring gears.

Face gears have the advantage of enabling the power input pinion to be defined by a straight or helical spur gear, so that meshing of the gears is unaffected by any axial movement of the pinion or, within reasonable limits, by displacement of the pinion in a direction parallel to the axis of the ring gear.

This enables the formation of transmissions in which the pinion meshes with and distributes torque to each of two coaxial ring gears, thus enabling compactness even in high-power applications with high transmission ratios.

To distribute the torque equally, transmissions are used, for example, in which the drive gear is defined by a floating pinion carried by the power input shaft, and which meshes with two coaxial counter-rotating ring gears facing each other and in turn meshing with one or more fixed transmission pinions rotating about respective axes substantially coplanar with the axis of the drive gear. The ability of the floating pinion to move in a direction parallel to the axis of the two ring gears enables the torque transmitted by the pinion to be distributed equally between the two ring gears regardless of inevitable dimensional tolerances of the gearing.

The above is a valid solution for transmissions with a single power input, as in single-engine helicopters.

In transmissions with more than one power input, however, as in multiple-engine helicopters, the need (for structural reasons) to provide more than one transmission pinion makes it difficult to distribute loads equally to transmission pinions with fixed axes of rotation. This balance depends on various factors involving the tooth thickness and position of the pinions; load dissymetry caused, for example, by nonsymmetrical drive pinions; and operating conditions with one engine excluded.

SUMMARY OF THE INVENTION

It is an object of the present invention to eliminate the aforementioned drawbacks by providing a gear transmission for transferring a drive torque from two or more power inputs to a single primary user, and which provides at all times for substantially balanced torque distribution by the transmission pinions, regardless of load conditions.

According to the present invention, there is provided a gear transmission assembly for transferring a drive torque from at least two power inputs to a primary user; characterized by comprising at least two drive pinions, each carried by a respective power input shaft and meshing with a pair of facing coaxial counter-rotating ring gears having respective facing face teeth and an axis perpendicular to the axis of the drive pinion; at least one of the ring gears being connected to the user; said ring gears engaging between the facing teeth at least one transmission pinion having an axis perpendicular to the axis of the ring gears; the drive pinions floating in the direction of the axis of the ring gears; and the at least one transmission pinion floating in a circumferential direction with respect to the ring gears.

BRIEF DESCRIPTION OF THE DRAWINGS

A non-limiting embodiment of the present invention will be described by way of example with reference to the accompanying drawings, in which:

FIG. 2 shows a partially sectioned plan view of a device for supporting the transmission pinions.

DETAILED DESCRIPTION OF THE INVENTION

Figure 1:
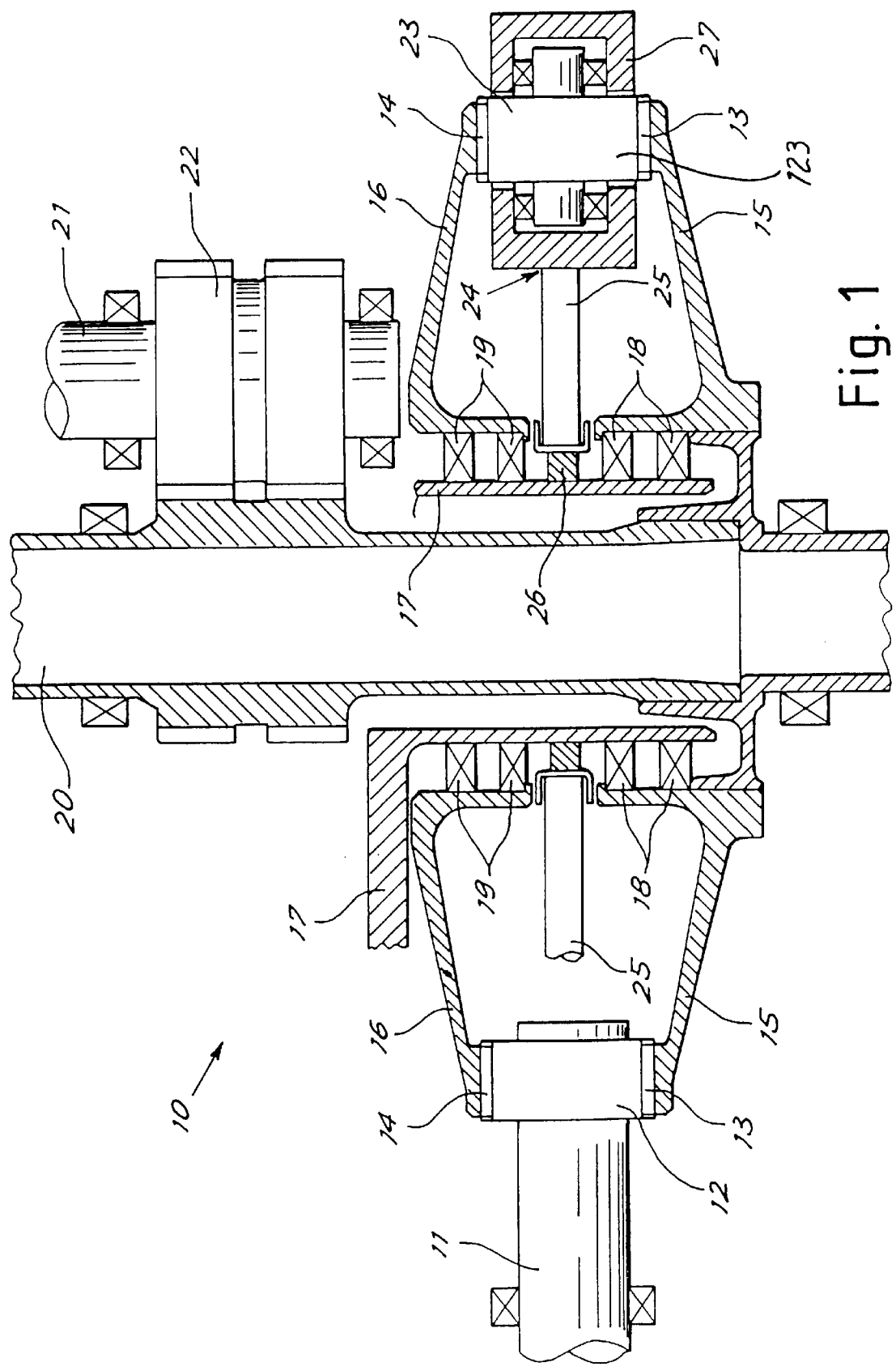
FIG. 1 shows a partial schematic section of a transmission assembly in accordance with the present invention.

FIG. 1 shows a transmission assembly 10 having a power input shaft 11 connected in known manner to an engine (not shown). Input shaft 11 is fitted with a cylindrical drive pinion 12 meshing with the respective teeth 13, 14 of a pair of face gears 15, 16 defined by two coaxial counter-rotating ring gears with facing peripheral face teeth.

For the sake of simplicity, the transmission assembly is shown in the accompanying drawings with only one power input shaft 11 and respective drive pinion 12, but may be connected to a number of power inputs identical to the one described. A typical embodiment of the transmission described may, for example, comprise two input shafts (twin-engine helicopter application) advantageously equally spaced angularly about the circumference of ring gears 15, 16. Drive pinions 12 are supported by respective shafts 11 so as to float in a direction parallel to the axis of the ring gears, by using, for example, shafts made of relatively elastic material and projecting with respect to the supports.

Ring gears 15, 16 are supported for rotation by a fixed structure (indicated schematically by 17) via the interposition of respective bearings 18, 19. For the sake of simplicity and to highlight the gearing of the transmission, the supporting structures of the various elements of the transmission are not generally shown in the accompanying drawings.

Ring gear 15 is connected in rotary manner to a power output shaft 20 to a primary user (not shown), e.g. the helicopter rotor. Further users, defined for example by auxiliary equipment, may be connected to respective power take-offs shown schematically in FIG. 1 by a shaft 21 and a respective pinion 22 meshing with primary shaft 20.

Ring gear 16 constitutes a balance element for distributing torque within the transmission, and is further connected to ring gear 15 by at least one transmission pinion 23 carried by a supporting structure 24.

According to the present invention, transmission pinions 23 are so supported as to be movable in a circumferential direction with respect to ring gears 15, 16, which, in the embodiment shown, may be achieved by making supporting structure 24 adequately flexible in said circumferential direction. More specifically, structure 24 is defined by arms 25 extending radially from an annular support 26 fitted to fixed structure 17 coaxially with ring gears 15, 16; and arms 25, which are flexible in a plane perpendicular to the axis of the ring gears, are fitted on the respective peripheral ends with seats or cages 27 housing pins 123 of transmission pinions 23 in rotary manner.

Arms 25 are made so flexible that the ratio between the tangential force applied to the pinions fitted to the ends of the arms, and the deformation produced by the force is as far as possible substantially constant.

Arms 25 are also so formed as to ensure reaction to the torque generated by the tangential forces acting on each transmission pinion 23. That is, in the case of transmissions with a number of transmission pinions 23, any overload on one causes the respective support to yield to a greater extent than the other supports, thus causing the other transmission pinions 23 to "approach" the teeth of the ring gears and so participate in the reaction.

At assembly, each pinion is obviously expected to actively contact the ring gears on the sides of the meshing teeth, which is assisted by manufacturing precision and the natural preload produced by the flexibility of the supports.

FIG. 2 shows a set of three pinions 23 equally spaced angularly along the circumference of ring gears 15, 16. Equal spacing of the pinions has proved particularly advantageous in effectively distributing torque flow within the transmission.

The characteristics of support 24 are such as to ensure transmission pinions 23 flex independently in a circumferential direction with respect to ring gears 15, 16, and so mesh correctly at all times with the teeth of both rings gears to ensure balanced distribution of the torque flow.

Clearly, changes may be made to the non-limiting embodiment described and illustrated herein without, however, departing from the scope of the accompanying claims.

In particular, though specifically designed to transfer power from two or more sources, the transmission according to the invention may also be used in the case of power input from one engine.

We claim:

1. A gear transmission assembly for transferring a drive torque from at least two power inputs to a primary user; characterized by comprising at least two drive pinions (12), each carried by a respective power input shaft (11) and meshing with a pair of facing coaxial counter-rotating ring gears (15, 16) having respective facing face teeth and axes perpendicular to the axes of the at least two drive pinions; at least one (15) of the ring gears being connected to the user; said ring gears (15, 16) engaging, between the facing teeth (13, 14), at least one transmission pinion (23) having an axis perpendicular to the axis of the ring gears; each drive pinion (12) floating elastically in the direction of the axis of the ring gears (15, 16); and the at least one transmission pinion (23) floating in a circumferential direction with respect to the ring gears.

2. A transmission assembly as claimed in claim 1, characterized by the at least one transmission pinion comprising at least two transmission pinions (23).

3. A transmission assembly as claimed in claim 2, characterized in that the transmission pinions (23) are equally spaced angularly along the circumference of the ring gears, and float independently in said circumferential direction.

4. A transmission assembly as claimed in claim 2, characterized in that the drive pinions (12) are equally spaced angularly along the circumference of the ring gears.

5. A transmission assembly as claimed in claim 1, characterized in that the transmission pinions (23) are supported by a flexible structure (24) flexible in a circumferential direction with respect to the ring gears.

6. A transmission assembly as claimed in claim 5, characterized in that the flexible structure (24) is coaxial with the ring gears (15, 16), and comprises a central structure from which extend radial arms (25) supporting the transmission pinions (23); said arms being flexible in a plane perpendicular to the axis of the ring gears.

7. A transmission assembly as claimed in claim 6, characterized in that the flexible arms (25) extend radially from a fixed ring (26) coaxial with the ring gears (15, 16), and are fitted at the peripheral ends with seats (27) housing pins (123) of the transmission pinions (23).

8. A transmission assembly as claimed in claim 6, characterized in that the elastic characteristic of the flexible arms is such that the ratio between the resultant tangential force applied to the transmission pinions (23) and the deformation produced by said force in the flexible arms (25) supporting the transmission pinions is substantially constant.

* * * * *

UNITED STATES PATENT AND TRADEMARK OFFICE
CERTIFICATE OF CORRECTION

PATENT NO. : 5,974,911
DATED : NOVEMBER 2, 1999
INVENTOR(S) : ROBERTO PIAS ET AL.

It is certified that error appears in the above-identified patent and that said Letters Patent is hereby corrected as shown below:

On the Title Page [57] Inventors: delete "Sergio Turro", insert -- Sergio Turra --

Signed and Sealed this

Seventh Day of November, 2000

Attest:

Q. TODD DICKINSON

*Attesting Officer*  *Director of Patents and Trademarks*